(12) United States Patent
Kitai et al.

(10) Patent No.: US 11,070,001 B2
(45) Date of Patent: Jul. 20, 2021

(54) CONNECTOR FORMATION STRUCTURE, ELECTRONIC CONTROL APPARATUS AND PRODUCTION METHOD FOR CONNECTOR FORMATION STRUCTURE

(71) Applicant: Hitachi Automotive Systems, Ltd., Hitachinaka (JP)

(72) Inventors: Yusuke Kitai, Hitachinaka (JP); Katsuhide Oohashi, Hitachinaka (JP); Ko Sasaki, Hitachinaka (JP); Takayuki Hagiya, Hitachinaka (JP); Takuya Igarashi, Hitachinaka (JP); Michimori Watanabe, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/626,606

(22) PCT Filed: May 24, 2018

(86) PCT No.: PCT/JP2018/019945
§ 371 (c)(1),
(2) Date: Dec. 26, 2019

(87) PCT Pub. No.: WO2019/008933
PCT Pub. Date: Jan. 10, 2019

(65) Prior Publication Data
US 2020/0161797 A1    May 21, 2020

(30) Foreign Application Priority Data

Jul. 7, 2017    (JP) .............................. JP2017-133841

(51) Int. Cl.
*H01R 13/405* (2006.01)
*H01R 13/504* (2006.01)
(Continued)

(52) U.S. Cl.
CPC ............ *H01R 13/504* (2013.01); *F02D 9/10* (2013.01); *H01R 13/405* (2013.01);
(Continued)

(58) Field of Classification Search
CPC ..... H01R 13/405; H01R 13/504; H01R 43/24
See application file for complete search history.

(56) References Cited

U.S. PATENT DOCUMENTS

| 4,826,443 A | 5/1989 | Lockard |
| 5,749,656 A * | 5/1998 | Boehm .................... G01K 7/22 338/28 |

(Continued)

FOREIGN PATENT DOCUMENTS

| CN | 101997214 A | 3/2011 |
| DE | 60 2006 000 223 T2 | 9/2008 |

(Continued)

OTHER PUBLICATIONS

International Search Report (PCT/ISA/210) issued in PCT Application No. PCT/JP2018/019945 dated Jul. 31, 2018 with English translation (five (5) pages).

(Continued)

*Primary Examiner* — Tho D Ta
(74) *Attorney, Agent, or Firm* — Crowell & Moring LLP

(57) ABSTRACT

Airtightness of a connector molding is improved. There is provided a connector molding in which a conductor and a fixing member are integrally molded with a molded body including a connector portion. The conductor is fixed to the fixing member, and is integrally molded with the molded body in a state in which an external connection end portion protrudes into a space within the connector portion. A part of the fixing member is exposed to the space within the (Continued)

connector portion and the remaining portion is covered by the molded body, or the entire fixing member is covered by the molded body.

9 Claims, 17 Drawing Sheets

(51) Int. Cl.
  *F02D 9/10* (2006.01)
  *H01R 13/66* (2006.01)
  *H01R 43/24* (2006.01)
  *H02K 5/10* (2006.01)
  *H02K 5/22* (2006.01)
  *H02K 7/116* (2006.01)

(52) U.S. Cl.
  CPC ........... *H01R 13/665* (2013.01); *H01R 43/24* (2013.01); *H02K 5/10* (2013.01); *H02K 5/225* (2013.01); *H02K 7/116* (2013.01); *H01R 2201/26* (2013.01)

(56) References Cited

U.S. PATENT DOCUMENTS

| | | | |
|---|---|---|---|
| 5,823,797 A | 10/1998 | Sugiyama | |
| 6,007,387 A | 12/1999 | Uchiyama | |
| 6,068,523 A * | 5/2000 | Takahashi | H01R 13/405 439/604 |
| 6,341,967 B1 * | 1/2002 | Nabeshima | H01R 13/405 439/130 |
| 6,527,989 B1 * | 3/2003 | Onoda | B29C 45/14065 264/40.1 |
| 7,192,317 B2 * | 3/2007 | Nakagawa | B29C 45/14639 439/736 |
| 7,255,610 B2 | 8/2007 | Oohashi et al. | |
| 2007/0295450 A1 * | 12/2007 | Brandenburg | H01R 43/24 156/293 |
| 2008/0012173 A1 | 1/2008 | Asao | |
| 2010/0291394 A1 * | 11/2010 | Klett | B29C 45/14311 428/458 |
| 2012/0094547 A1 * | 4/2012 | Ando | H01R 43/24 439/736 |
| 2012/0238150 A1 | 9/2012 | Sakamoto et al. | |

FOREIGN PATENT DOCUMENTS

| | | |
|---|---|---|
| JP | 9-213427 A | 8/1997 |
| JP | 10-193363 A | 7/1998 |
| JP | 2005-174697 A | 6/2005 |
| JP | 2008-18633 A | 1/2008 |
| JP | 2012-146602 A | 8/2012 |

OTHER PUBLICATIONS

Japanese-language Written Opinion (PCT/ISA/237) issued in PCT Application No. PCT/JP2018/019945 dated Jul. 31, 2018 (eight (8) pages).

German-language Office Action issued in German Application No. 11 2018 002 860.7 dated Jan. 26, 2021 with partial English translation (12 pages).

* cited by examiner

CONNECTOR FORMATION STRUCTURE, ELECTRONIC CONTROL APPARATUS AND PRODUCTION METHOD FOR CONNECTOR FORMATION STRUCTURE

TECHNICAL FIELD

The present invention relates to a connector molding, an electronic control device, and a method for manufacturing a connector molding.

BACKGROUND ART

In an electronic control device such as an electric throttle device which is a valve control device for an internal combustion engine, it is known that a connector connected to an external control device is integrally molded with a cover and a case of the electric throttle device. The connector includes a plurality of connection pins each of which one end is connected to an external device and the other end is connected to an internal electronic component. The inside of the electric throttle device needs to be airtight to the outside, and the plurality of connection pins formed at the connector needs to have a structure in which moisture and humidity do not infiltrate through the connection pins.

The following molded body is known as a cover of a battery module in which a connector portion is integrally molded. A primary molded body is produced by using the connection pins as insert members, and a connector molding which is a secondary mold body is produced by using the primary molded body as an insert member. When the secondary molded body is produced, the primary molded body is held by a receiving portion formed at a mold. The receiving portion is disposed outside the connector portion. Therefore, when the secondary molded body is taken out from the mold, the primary molded body held by the receiving portion of a lower mold is exposed to the outside on the outside of the connector portion (see, for example, PTL 1).

CITATION LIST

Patent Literature

PTL 1: JP 2012-146602 A

SUMMARY OF INVENTION

Technical Problem

In the connector molding described in PTL 1, there is a possibility that moisture and humidity infiltrate through the primary molded body from a portion exposed to the outside on the outside the connector portion.

Solution to Problem

According to a first aspect of the present invention, there is provided a connector molding that includes a conductor that includes an external connection end portion, a fixing member that fixes the conductor, and a molded body that includes a connector portion having an internal space through which the external connection end portion is exposed. The conductor and the fixing member are integrally molded with the molded body. The conductor is fixed to the fixing member, and is integrally molded with the molded body in a state in which the external connection end portion protrudes into the space within the connector portion, and (i) a part of the fixing member is exposed to the space within the connector portion, and a remaining portion is covered by the molded body or (ii) the entire fixing member is not exposed from an outer surface of the molded body.

According to a second aspect of the present invention, there is provided an electronic control device including the connector molding according to the first aspect and a housing that houses a component. The connector molding includes a housing portion that houses an electronic component, an internal connection end portion of the conductor is connected to the electronic component within the housing portion, and the housing portion and the housing are assembled while being sealed from the outside.

According to a third aspect of the present invention, there is provided a method for manufacturing a connector molding including fixing a conductor including an external connection end portion by a fixing member, and supporting a part of the fixing member by a support portion of a mold, and forming a molded body including a connector portion having an internal space through which the external connection end portion is exposed through insert-molding using the conductor and the fixing member as insert members. The molding is performed such that the part of the fixing member supported by the mold is positioned at an interface with the space of the connector portion.

Advantageous Effects of Invention

According to the present invention, it is possible to improve airtightness of a connector molding.

BRIEF DESCRIPTION OF DRAWINGS

FIGS. 13A and 13B are diagrams for describing adhesion between the fixing member and the molded body in the structure illustrated in FIG. 2, in which FIG. 13A is a structural diagram of the embodiment of the present invention and FIG. 13B is a structural diagram of a comparative product.

FIGS. 14A and 14B illustrate a second embodiment of the connector molding of the present invention, in which FIGS. 14A and 14B are cross-sectional views for describing a manufacturing method thereof.

DESCRIPTION OF EMBODIMENTS

First Embodiment

Hereinafter, a first embodiment of a connector molding according to the present invention will be described with reference to FIGS. 1 to 9.

Figure 1:
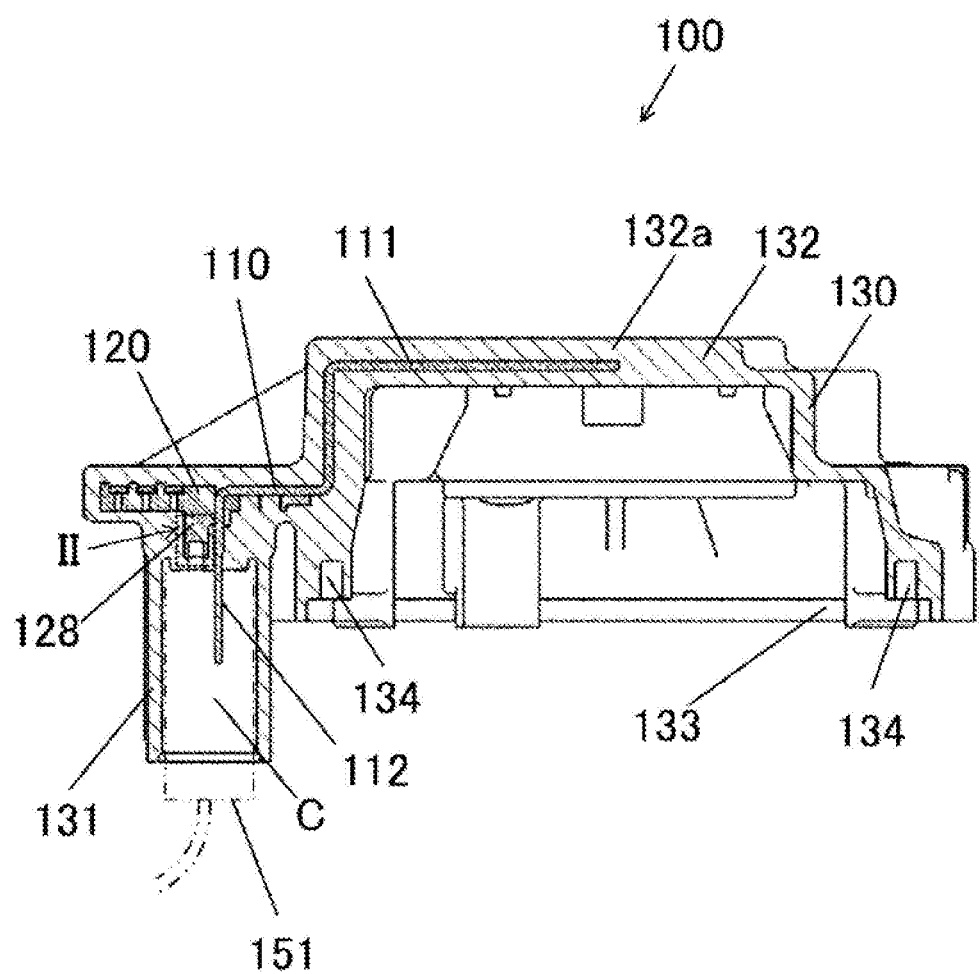
FIG. 1 is a cross-sectional view of a first embodiment of a connector molding of the present invention as an example of a cover of an electric throttle device.

FIG. 1 is a cross-sectional view of the first embodiment of the connector molding according to the present invention. In the following embodiments, an example of the connector molding is described as a cover that covers a reduction gear mechanism of an electric throttle device.

A connector molding 100 includes a plurality of conductors 110 (see FIG. 3), a fixing member 120, and a molded body 130. The connector molding is produced by integrally molding the plurality of conductors 110 and the fixing member 120 as insert members in the molded body 130.

Each conductor 110 includes a leading portion 111 disposed in the molded body 130, an end (external connection end portion) 112 for external connection formed on one end side of the leading portion 111, and the other end (internal connection end portion) 113 (see FIG. 3) formed at the other end side of the leading portion.

The fixing member 120 has a fixing portion that fixes each conductor 110 before molding is performed. A structure of the fixing portion will be described below, but in the connector molding 100 of the present embodiment, the conductor 110 and the fixing member 120 are not primary molded products, and are produced by one molding in a state in which the conductor 110 is fixed to the fixing member 120.

The molded body 130 includes a connector portion 131 and a housing portion 132 that is disposed adjacent to the connector portion 131 to house electronic components. The connector portion 131 has a space C therein, and one end 112 of each conductor 110 protrudes into the space C from a base side of the connector portion 131 toward a tip side. The housing portion 132 has a top plate portion 132a formed at an upper portion and an opening portion 133 formed at a lower portion. The leading portion 111 of each conductor 110 is disposed at the top plate portion 132a. A groove 134 in which a seal member 31 (see FIG. 11) is fitted is formed at a peripheral edge of the opening portion 133 of the housing portion 132. The groove 134 is formed in an annular shape around the opening portion 133. When the housing portion 132 is attached to another case member through the seal member 31 fitted in the groove 134, the inside of the housing portion 132 is airtight with respect to the outside. That is, the groove 134 formed around the opening portion 133 of the housing portion 132 serves as a sealing forming structure portion for forming a sealing structure.

The fixing member 120 and the molded body 130 can be made of, for example, a thermoplastic resin such as polybutylene terephthalate (PBT). The fixing member 120 and the molded body 130 are preferably made of the same material.

Figure 2:
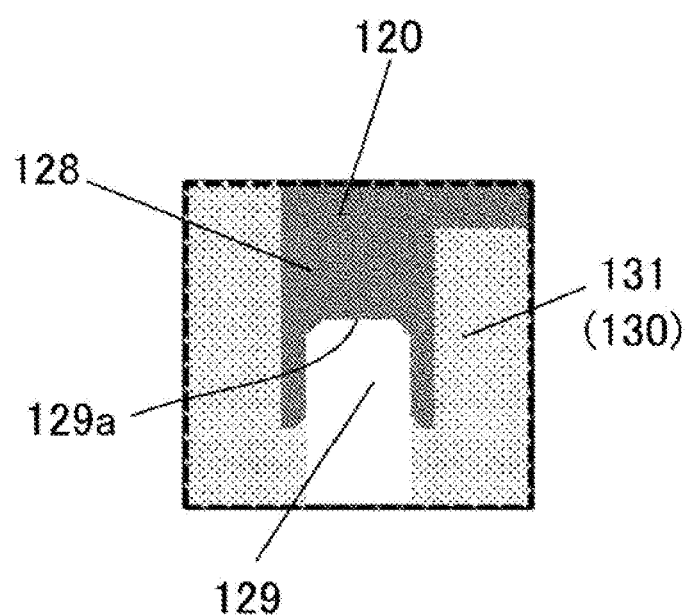
FIG. 2 is an enlarged cross-sectional view of a region II in FIG. 1.

FIG. 2 is an enlarged cross-sectional view of a region II in FIG. 1.

The fixing member 120 is disposed on the base side of the connector portion 131, and has a portion exposed to the space C of the connector portion 131. A receiving portion 128 includes recess portions 129 (see FIG. 13) into which holding pins 211 (see FIG. 6) of a lower mold 210 to be described below are formed at the fixing member 120 on the space C side of the connector portion 131. The fixing member 120 is buried in the molded body 130, and the remaining portion except for the receiving portion 128 exposed to the space C of the connector portion 131 is covered with the molded body 130.

In a use state, a female connector 151 for connecting internal components of the connector molding 100 to an external control device is inserted into the space C of the connector portion 131, as depicted by a two-dot chain line in FIG. 1. Thus, compared to a structure in which the receiving portion 128 of the fixing member 120, that is, the exposed portion is disposed outside the connector portion 131, it is possible to improve the airtightness of the connector molding 100.

Hereinafter, the first embodiment of the present invention will be described in more detail.

Figure 3:
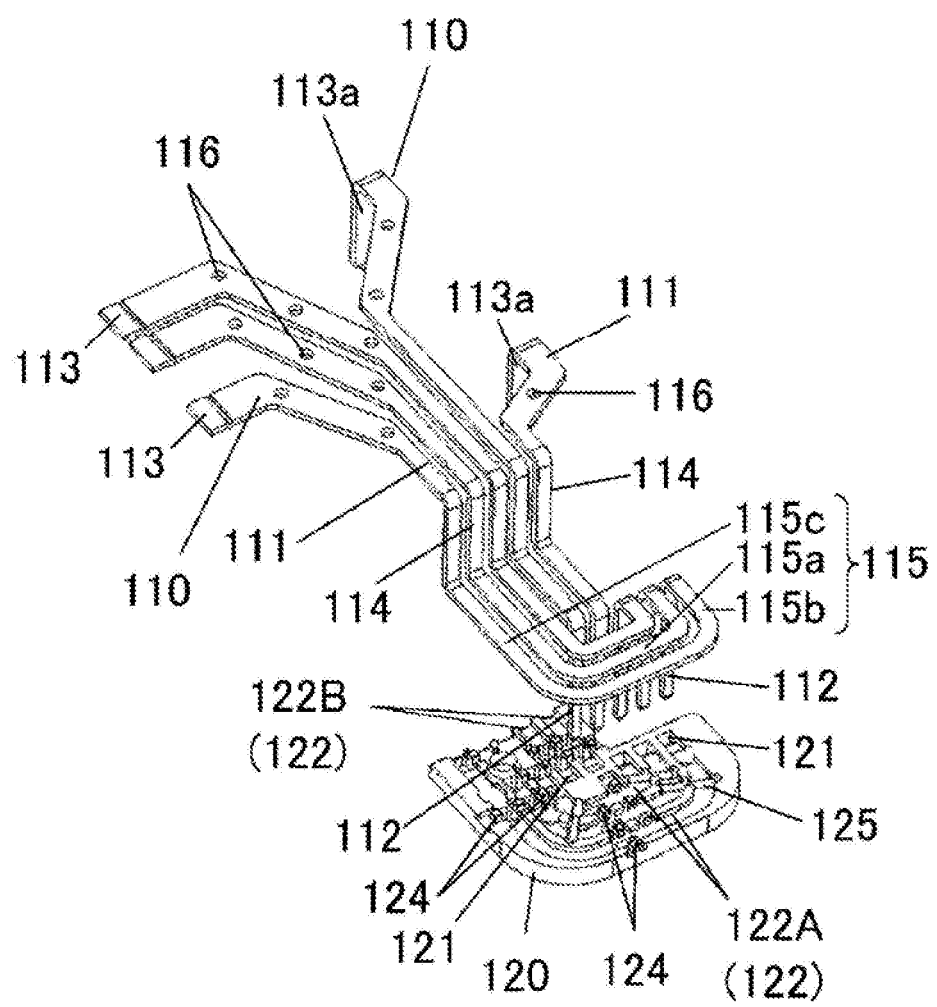
FIG. 3 is an exploded perspective view for describing a method for fixing a conductor to a fixing member illustrated in FIG. 1.
Figure 4:
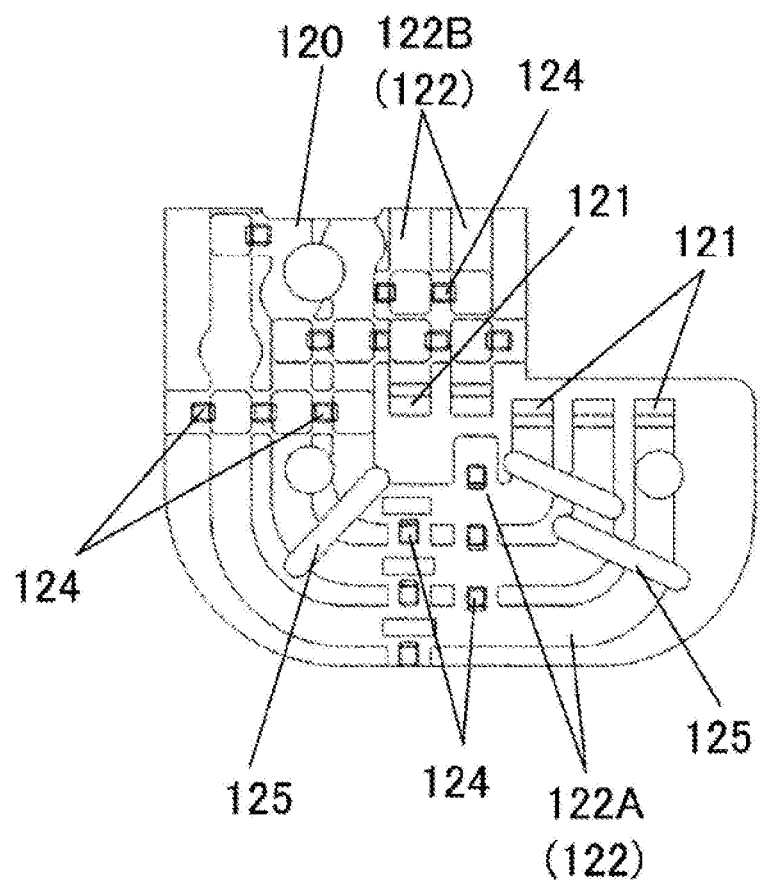
FIG. 4 is a top view of the fixing member illustrated in FIG. 3.

FIG. 3 is an exploded perspective view for describing a method for fixing the conductor to the fixing member illustrated in FIG. 1, and FIG. 4 is a top view of the fixing member illustrated in FIG. 3.

An example in which the connector molding 100 of the present embodiment includes five conductors 110 is illustrated in FIG. 3. Each conductor 110 includes one end 112 and the other ends 113 and 113a bent so as to be substantially perpendicular to the leading portion 111. Three of the conductors 110 are formed in a flat shape in which the other end 113 extends substantially on the same plane as the leading portion 111. Two of the conductors 110 are formed such that the other end 113a is bent so as to be substantially perpendicular to the leading portion 111 and extends in parallel with the one end 112. As will be described below, the two conductors 110 each having the other end 113a are connected to a motor 11 (see FIG. 11), and the other three conductors 110 are connected to a TPS board 28 (see FIG. 9).

A stepped portion 114 which is substantially vertically bent is formed in a middle portion of each conductor 110 in a lengthwise direction. A U-shaped folded portion 115 is formed in the vicinity of one end 112 of the leading portion 111 of each conductor 110. The folded portion 115 includes an intermediate portion 115a, and one side portion 115b and the other side portion 115c which are substantially vertically bent on both sides of the intermediate portion 115a. One to three pin holes 116 are formed in the leading portion 111 of each conductor 110. Although details will be described below, a mold support pin 212a (see FIG. 6) passes through the pin hole 116, and molding is performed in this state. That is, the pin hole 116 is formed in a location in which each conductor 110 is easily deformed, and is used for suppressing the deformation of the conductor 110 by the support pin 212a inserted into the pin hole 116 at the time of molding.

As illustrated in FIGS. 3 and 4, the fixing member 120 is a flat member having a substantially L-shape. Five fixing through holes 121 passing through one end 112 of each conductor 110 are formed the fixing member 120 so as to penetrate through a plate thickness. Holding grooves 122A in which the folded portions 115 of the three conductors 110 each having the other end 113 are fitted and holding grooves 122B in which vicinities of the one ends 112 of the leading portions 111 of the two conductors 110 each having the other end 113a are fitted are formed in the fixing member 120. The five fixing through holes 121 are formed in the end portions of the holding grooves 122A and 122B. Hereinafter, the holding grooves 122A and 122B may be collectively referred to as the holding grooves 122.

The fixing member 120 includes a plurality of snap-fit structures 124 for fixing the conductors 110 fitted in the holding grooves 122. The fixing member 120 includes the receiving portion 128 (see FIG. 5) formed on a rear surface side, that is, on an opposite side to a surface on which the holding grooves 122 are formed.

Figure 7:
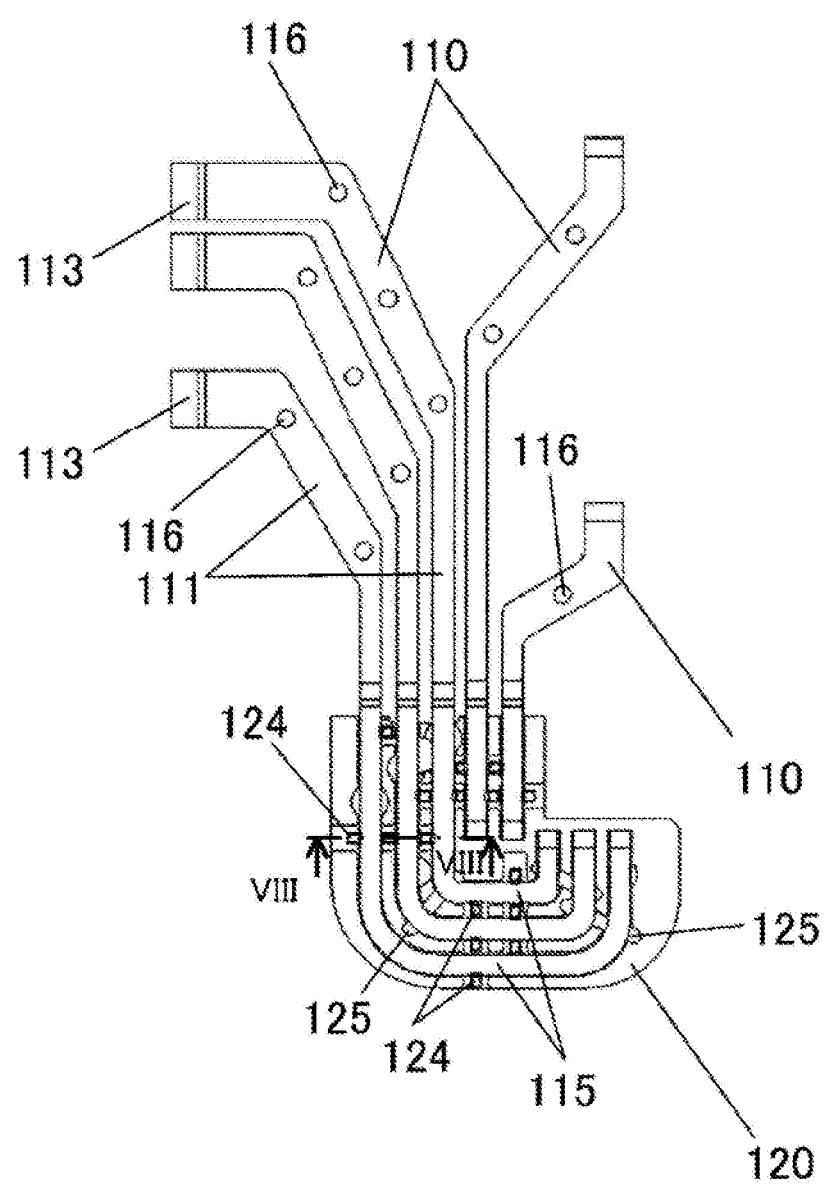
FIG. 7 is a top view illustrating a state in which the conductor illustrated in FIG. 3 is fixed to the fixing member.
Figure 8:
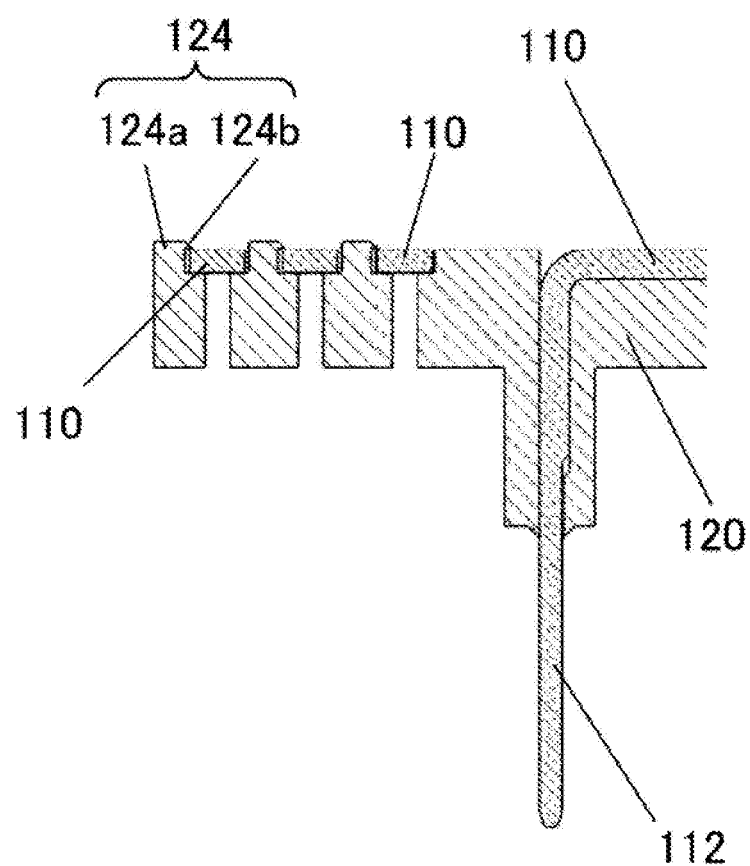
FIG. 8 is a cross-sectional view taken along a line VIII-VIII in FIG. 7.

FIG. 7 is a top view illustrating a state in which the conductor is fixed to the fixing member illustrated in FIG. 3, and FIG. 8 is a cross-sectional view taken along a line VIII-VIII in FIG. 7.

As described in FIG. 3, one end 112 passes through the fixing through hole 121 of the fixing member 120, and thus, each conductor 110 is fixed to the fixing member 120. Each conductor 110 is fitted in the holding groove 122 in the vicinity of one end 112 of the leading portion 111, and is fixed by the snap-fit structure 124 in this state. The plurality of snap-fit structures 124 is formed along each holding groove 122. As illustrated in FIG. 8, each snap-fit structure 124 includes a side portion 124a of the holding groove 122 and an engagement piece 124b formed at a tip of the side portion 124a. The side portion 124a is formed as a support structure having flexibility, and the engagement piece 124b side formed on a tip side is bent in a direction away from a direction in which the engagement piece is close to the holding groove 122 from a base side. Thus, when the conductor 110 is pushed into the holding groove 122 side, the engagement piece 124b is bent in the direction away from the holding groove 122. When the conductor 110 is pushed in, the engagement piece 124b is returned to the holding groove 122 side by a restoring force, and the conductor 110 is fixed.

A plurality of openings 125 is formed in the fixing member 120. However, since the openings 125 are formed, the snap-fit structure 124 is easily deformed, and thus, it is possible to easily fix the conductor 110. When the molding is performed, the opening 125 is filled with a mold resin, the opening 125 has a function of suppressing the deformation of the fixing member 120 after the molding and improving adhesion to the molded body.

One end 112 of each conductor 110 is fixed by passing through the fixing through hole 121 of the fixing member 120, and a part of the leading portion 111 is fixed by the snap-fit structure 124. That is, each conductor 110 is fixed to the fixing member 120 by a first fixing portion constituted by the fixing through holes 121 of the fixing member 120 and a second fixing portion constituted by the snap-fit structures 124 of the fixing member 120. Thus, the conductors 110 are securely fixed at predetermined positions, and are accurately arranged without crossing each other. Particularly, since the U-shaped folded portion 115 is fixed by the first fixing portion and the second fixing portion with the intermediate portion 115a interposed therebetween, the folded portion has a structure capable of being securely fixed to the fixing member 120 even though the pin hole 116 into which the support pin 212a is inserted is not formed as will be described below.

Next, a method for insert-molding the conductor 110 and the fixing member 120 will be described.

Figure 5:
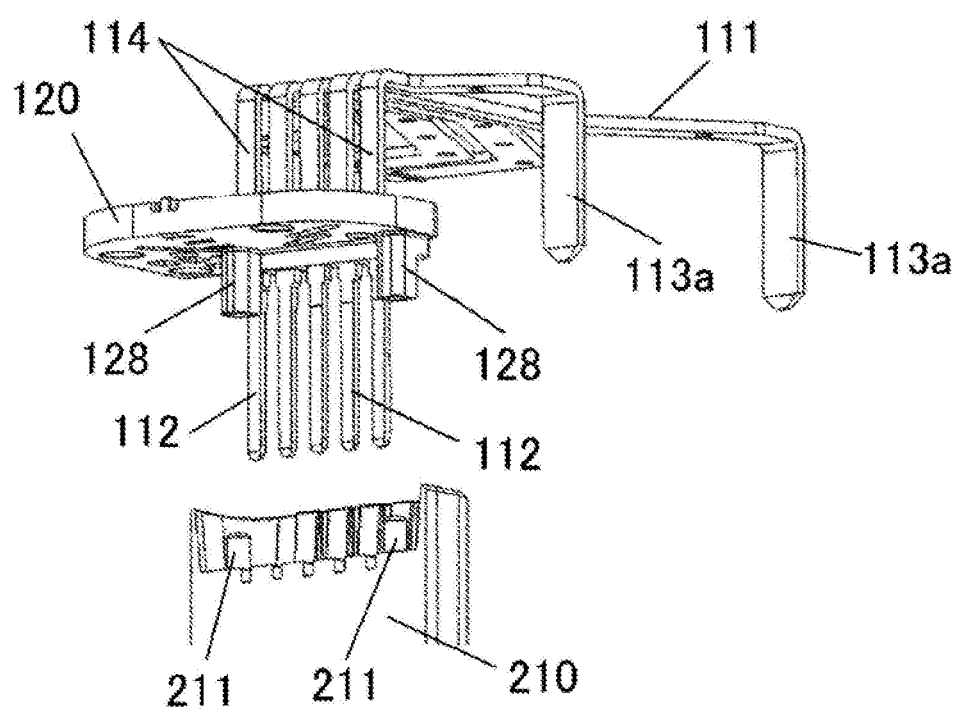
FIG. 5 is an exploded perspective view for describing a method for fixing the conductor fixed to the fixing member illustrated in FIG. 3 to a mold.
Figure 6:
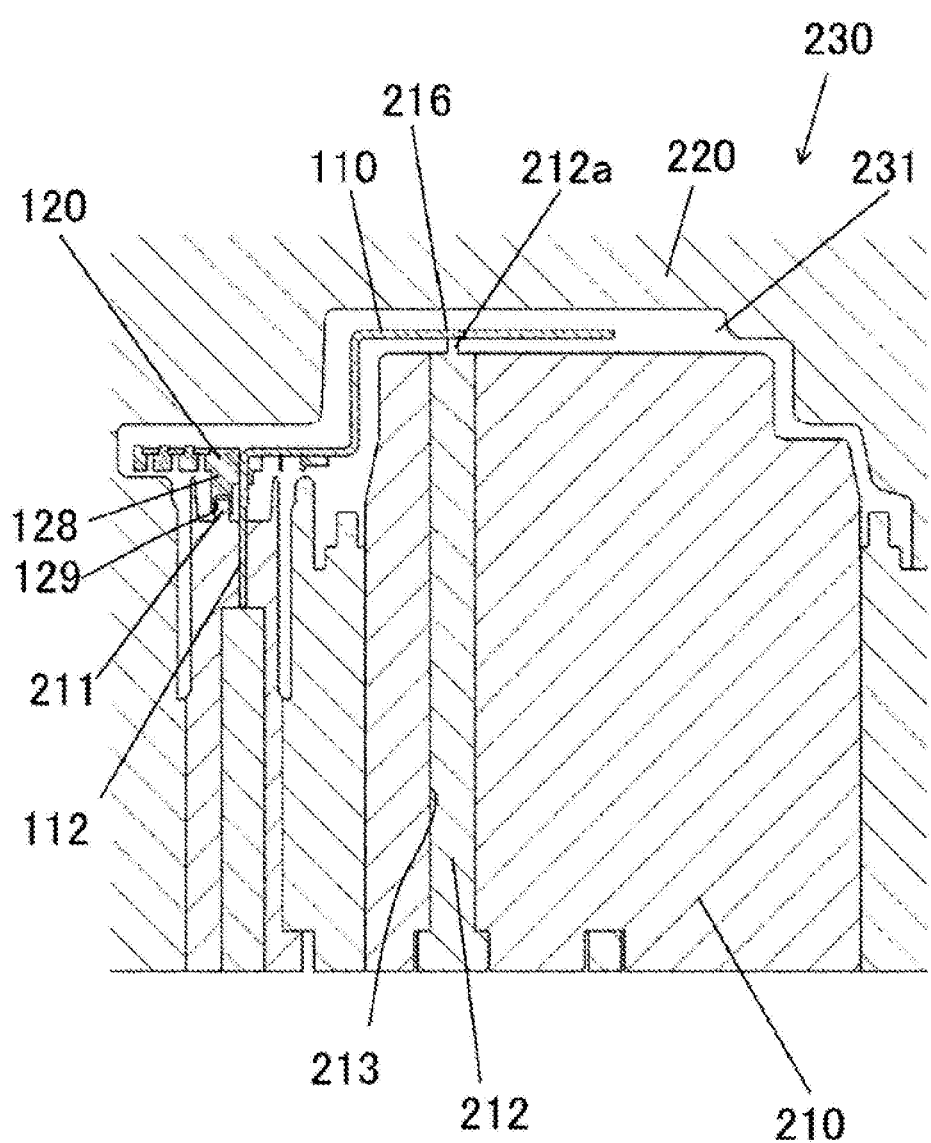
FIG. 6 is a cross-sectional view for describing a method for insert-molding the conductor and the fixing member.

FIG. 5 is an exploded perspective view for describing a method for fixing the conductor fixed to the fixing member illustrated in FIG. 3 to the mold, and FIG. 6 is a cross-sectional view for describing a method for insert-molding the conductor and the fixing member.

As illustrated in FIG. 5, two receiving portions 128 are formed on an opposite side of a surface of the fixing member 120 on which the holding groove 122 is formed in a protrusion shape so as to be separated from each other. As illustrated in FIGS. 2 and 6, the recess portion 129 is formed on the tip side of each receiving portion 128.

The mold 230 includes the lower mold 210 that supports the fixing member 120 and the conductor 110, and an upper mold 220. Two holding pins 211 inserted into the recess portions 129 of the receiving portion 128 of the fixing member 120 are formed at the lower mold 210. The support pin 212a passing through the pin hole 116 of the conductor 110 is formed at the lower mold 210. The support pin 212a is formed at a tip of the pin support member 212 passing through a guide hole 213 formed at the lower mold 210.

In order to perform the insert-molding, one end 112 of each conductor 110 passes through the fixing through hole 121 of the fixing member 120 in advance, and the leading portion 111 is fixed by the snap-fit structure 124 of the fixing member 120.

Next, the holding pin 211 of the lower mold 210 passes through the recess portion 129 of the receiving portion 128 of the fixing member 120, and a bottom surface 129a (see FIG. 2) of the recess portion 129 abuts on an upper surface of the holding pin 211 of the lower mold 210. The support pin 212a of the lower mold 210 passes through the pin hole 116 of each conductor 110. At this time, since the holding pin 211 of the lower mold 210 passes through the recess portion 129 of the receiving portion 128 at two locations, the rotation of the fixing member 120 around the lower mold 210 is restricted, and it is possible to accurately and easily position the conductor 110. The upper mold 220 is closed, and the mold is clamped. This state is illustrated in FIG. 6. A mold resin is injected into a cavity 231 formed in a shape of the molded body 130 by the lower mold 210 and the upper mold 220, and the insert-molding is performed.

Accordingly, the connector molding 100 illustrated in FIG. 1 is produced. In the connector molding 100, the recess portions 129 of the two receiving portions 128 of the fixing member 120 into which the holding pins 211 of the lower mold 210 are inserted are exposed in the space C in the connector portion 131. Openings 137 (see FIG. 9) are formed in the molded body 130 in the vicinity of the pin holes 116 of the conductor 110 into which the support pins 212a are passed through. However, since the openings 137 formed in the molded body 130 are arranged in a structure sealed by the groove 134, the openings do not serve as an infiltration path for moisture and humidity.

Figure 9:
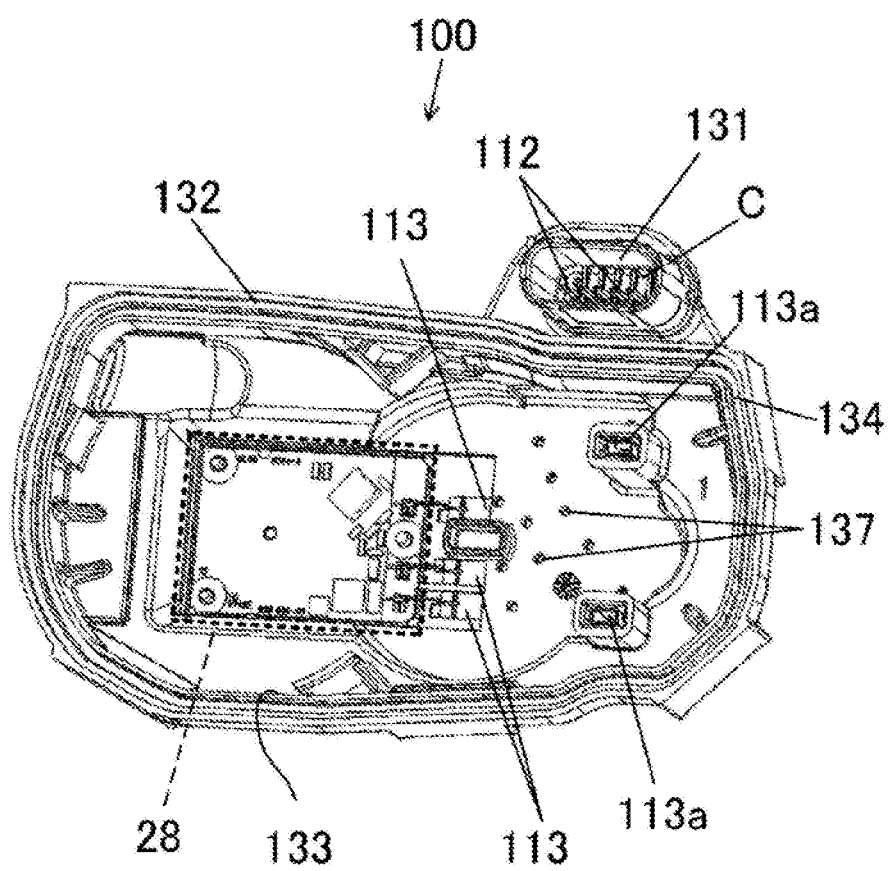
FIG. 9 is a plan view illustrating a structure inside a cover of the electric throttle device.

FIG. 9 is a perspective view of the connector molding 100 which is a cover of the electric throttle device when viewed from an inner surface side.

One end 112 of the conductor 110 is disposed in the space C inside the connector portion 131. The other end 113a of the conductor 110 protrudes from an inner surface of the housing portion 132 and is disposed in the vicinity of a side edge portion of the inner space of the molded body 130. The other end 113 of the conductor 110 is exposed from the inner surface of the housing portion 132 and is disposed at a substantially central portion of the internal space of the molded body 130. The groove 134 which is the sealing forming structure portion is formed so as to surround the periphery of the opening portion 133 of the housing portion 132 of the molded body 130.

In the connector molding 100 of the present embodiment, a part of the fixing member 120 is exposed to the space C of the connector portion 131, and the remaining portion is buried in the molded body 130, that is, is covered by the molded body 130. The female connector 151 is fitted to one end 112 of the conductor 110. Thus, the infiltration of the moisture and humidity into the exposed portion of the fixing member 120 is suppressed. The other ends 113 and 113a of the conductor 110 are disposed in an airtight space formed by the groove 134 which is the sealing forming structure portion of the molded body 130. Therefore, it is possible to improve the airtightness of the connector molding 100 compared to a structure in which the fixing member 120 is disposed outside the connector portion 131.

In the present embodiment, since the insert-molding is performed in a state in which the support pins 212a provided in the mold 230 are inserted into the pin holes 116 of each conductor 110, it is possible to prevent the deformation of the conductor 110 at the time of the molding.

However, as illustrated in FIG. 6, the pin support member 212 on which the support pins 212a are formed has a large diameter. An area of a base portion of the connector portion 131 is small, and one ends 112 of several conductors 110 are arranged in this small area. Therefore, when the support pins 212a are formed in the region of the conductor 110 corresponding to the connector portion 131, it is difficult to form the pin support member 212 including the support pins 212a inserted into the pin holes 116 in the mold 230. Thus, in the present embodiment, the folded portion 115 of the conductor 110 is fixed by the snap-fit structure 124 irrespective of the pin holes 116 as described above. Accordingly, it is possible to perform the insert-molding in a state in which the folded portions 115 of several conductors 110 are fixed in the region corresponding to the connector portion 131 having the small area.

In the method for performing the insert-molding in a state in which the folded portions 115 of several conductors 110 are fixed by the support pins 212a in the region corresponding to the connector portion 131, a portion of the conductor 110 which abuts on the support pins 212a after the molding is exposed to the outside. Since the connector portion 131 is disposed outside the housing portion 132 sealed from the outside, moisture and humidity infiltrates from the portion exposed to the space C of the connector portion 131. Therefore, it is possible to improve the airtightness compared to the structure in which the folded portions are fixed by the support pins 212a by fixing the folded portion 115 of the conductor 110 by the snap-fit structure 124.

The connector molding 100 of the present embodiment includes a separation suppressing structure in which the fixing member 120 and the molded body 130 are prevented from generating a gap therebetween or from being separated. Next, the separation suppressing structure will be described.

Figure 13A:
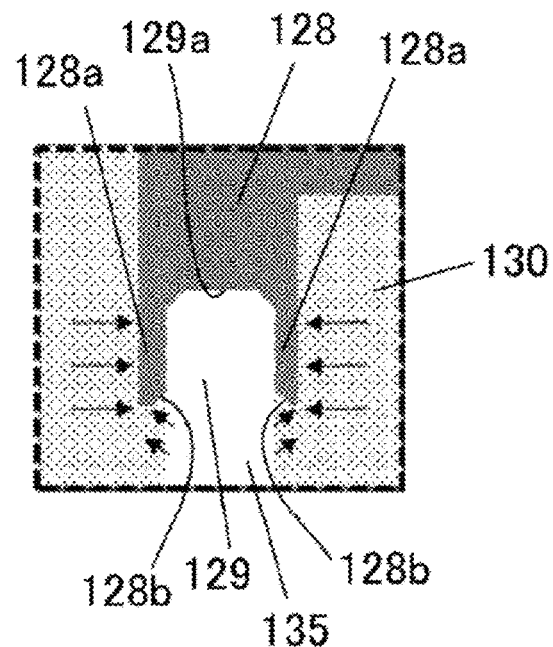
Figure 13B:
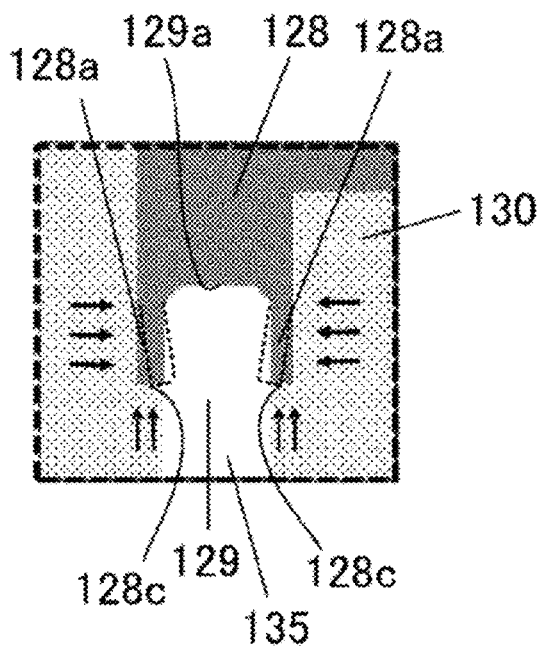

FIG. 13 is a diagram for describing the adhesion between the fixing member and the molded body in the structure illustrated in FIG. 2. FIG. 13(a) is a structural diagram of one embodiment of the present invention, and FIG. 13(b) is a structural diagram of a comparative product.

As illustrated in FIG. 13(a), the receiving portion 128 has a side wall 128a formed around the bottom surface 129a of the recess portion 129. A separation suppression portion 128b is formed at a tip of the side wall 128a. The separation suppressing portion 128b has an inclined surface facing an opposite side of the bottom surface 129a from an interface with the recess portion 129 toward the inside of the molded body 130.

Since the molded body 130 is thermally contracted after the insert-molding, a stress acting in a direction in which the side wall 128a is pushed toward the recess portion 129 is generated on the side wall 128a of the receiving portion 128. At this time, as illustrated by arrows in FIG. 13(a), a stress acts on the inclined surface in a vertical direction at the separation suppressing portion 128b from a peripheral portion side of an opening 135 of the molded body 130 (an opening corresponding to the support pin 212a of the lower mold 210). This stress has a component force in a direction in which the stress acting on the side wall 128a is canceled.

In contrast, in the comparative product illustrated in FIG. 13(b), a tip surface 128c of the side wall 128a around the receiving portion 128 is perpendicular to the side wall 128a, and does not have the inclined surface, that is, the separation suppressing portion 128b. In this structure, the stress in the direction in which the stress acting in the direction in which the side wall 128a is pushed toward the recess portion 129 is canceled does not act on the tip surface 128c, as illustrated by arrows in FIG. 13(b). Thus, as illustrated by a dotted line in FIG. 13(b), the side wall 128a is deformed so as to be pushed toward the recess portion 129, and a gap is formed at the interface between the side wall 128a and the molded body 130, or the side wall 128a is separated from the molded body 130.

Therefore, the fixing member 120 including the separation suppressing portion 128b illustrated as an example of the present embodiment in FIG. 13(a) has a great effect of suppressing the separation from the molded body 130 compared to the fixing member not including the separation suppressing portion 128b.

In FIG. 13(a), the separation suppressing portion 128b is illustrated as the inclined surface. However, the separation suppressing portion 128b may have a stepped shape.

Next, the electric throttle device produced by using the connector molding 100 of the present embodiment will be described.

An example of the electric throttle device to be described below is described as a motor-driven throttle valve for an internal combustion engine.

Figure 10:
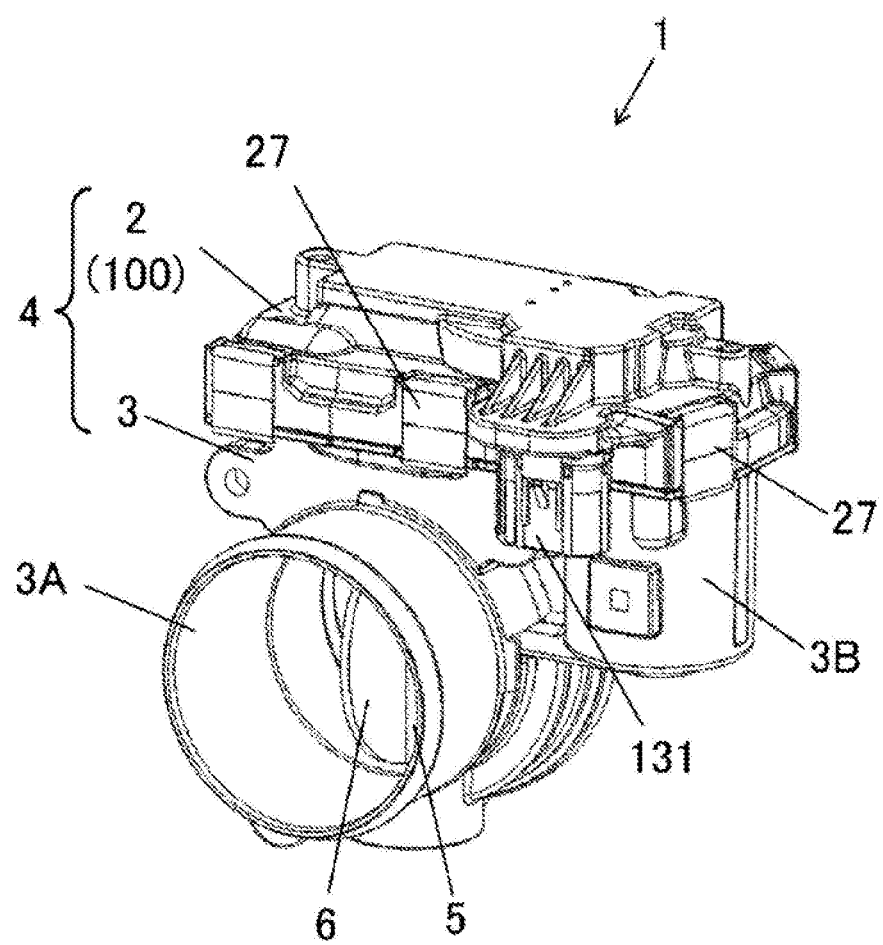
FIG. 10 is an external perspective view of the electric throttle device including the connector molding illustrated in FIG. 9.

FIG. 10 is an external perspective view of the electric throttle device including the connector molding illustrated in FIG. 9.

The electric throttle device 1 has a housing 4 including a gear cover 2 and a throttle body 3. The gear cover 2 is the connector molding 100 illustrated in FIG. 9, and will be described as the gear cover 2 below. The throttle body 3 is made of aluminum or an alloy thereof. The throttle body 3 includes a bore portion 3A and a motor housing portion 3B. The gear cover 2 and the throttle body 3 are fixed by a plurality of clips 27.

The bore portion 3A is a gas passage. A throttle shaft 5 that traverses the bore portion 3A in a radial direction is rotatably provided at the throttle body 3 by being supported by a bearing (not illustrated) attached to the throttle body 3. Although not illustrated, the throttle shaft 5 extends into a housing portion 2A (see FIG. 11) of the gear cover 2, and a throttle gear 21 (see FIG. 12) is fixed to an end portion thereof. A throttle valve 6 formed in a disk shape by using metal is fixed to the throttle shaft 5. The throttle valve 6 is inserted into a slit formed in a corresponding region of the bore portion 3A of the throttle shaft 5, and is fastened by a bolt. The throttle shaft 5 is rotated, and thus, the throttle valve 6 disposed at the passage of the bore portion 3A is rotated. The throttle valve 6 is rotated, and thus, an opening degree of the throttle valve 6 with respect to the bore portion 3A is changed. Accordingly, a cross-sectional area of the gas passage is changed, and thus, a flow rate of an intake gas supplied to an engine is controlled.

Figure 11:
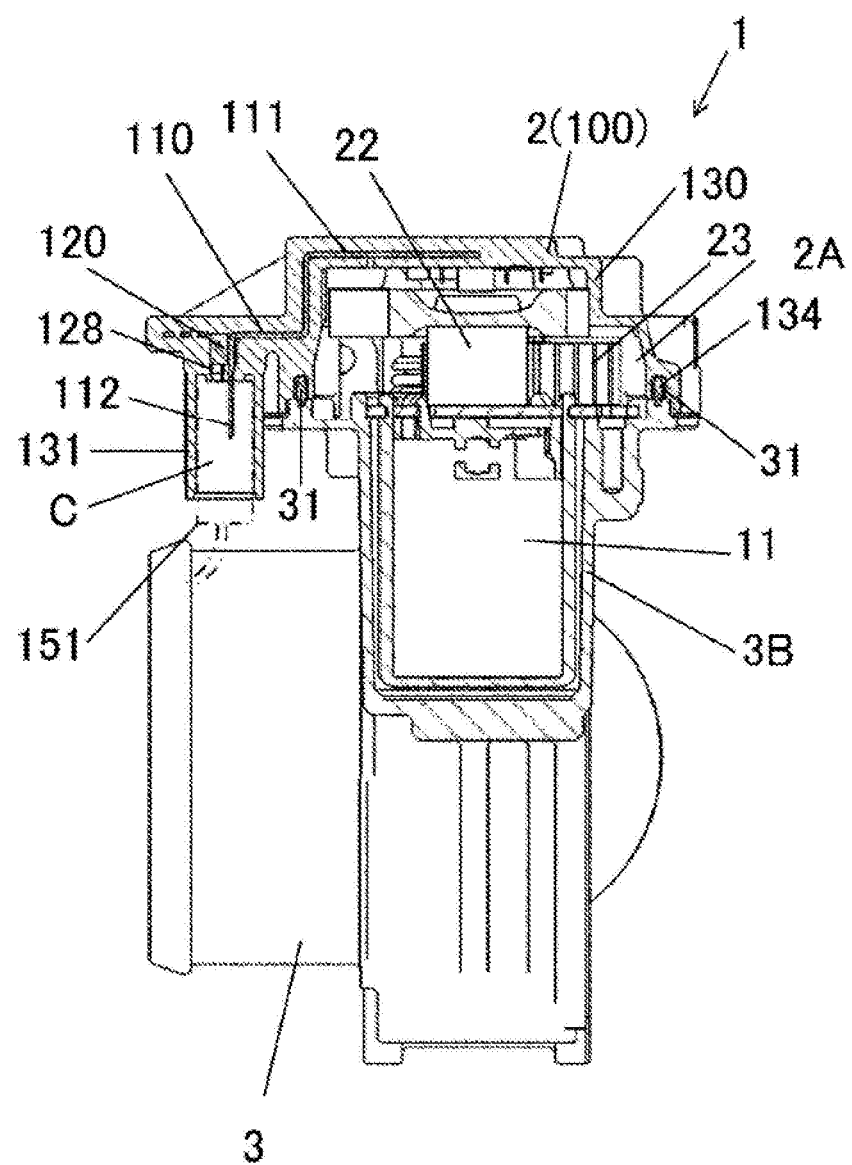
FIG. 11 is a cross-sectional view of the electric throttle device.
Figure 12:
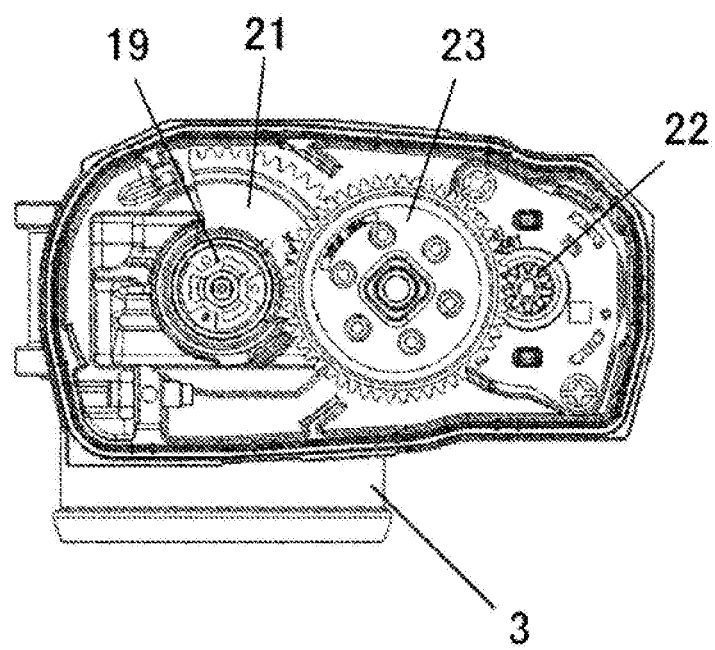
FIG. 12 is a top view illustrating an internal structure of the electric throttle device illustrated in FIG. 11 in which a gear cover is removed.

FIG. 11 is a cross-sectional view of the electric throttle device, and FIG. 12 is a top view illustrating an internal structure of the electric throttle device illustrated in FIG. 11 in which the gear cover is removed.

When the seal member 31 is fitted in the groove 134 of the gear cover 2 and the gear cover 2 and the throttle body 3 are assembled by the clips 27 (see FIG. 10), the inside (including the inside of the motor housing portion 3B) of the throttle body 3 except for the gear cover 2 and the bore portion 3A is sealed. However, the space C of the connector portion 131 is disposed outside the sealing structure.

The motor 11 for rotating the throttle shaft 5 (see FIG. 10) is housed in the motor housing portion 3B. The motor 11 is disposed such that a motor shaft is parallel to the throttle shaft 5, is connected to the other end 113*a* of the conductor 110 exposed inside the gear cover 2, and is driven by a control device provided from the outside. An end portion of the motor shaft is disposed inside the gear cover 2, and a metal gear 22 having a small number of teeth is fixed to the end portion of the motor shaft. As illustrated in FIG. 12, an end portion (not illustrated) of the throttle shaft 5 is disposed inside the gear cover 2, and the throttle gear 21 is fixed to an upper side of the throttle shaft 5. An intermediate gear 23 is disposed between the gear 22 and the throttle gear 21. The gear 22, the intermediate gear 23, and the throttle gear 21 constitute a reduction gear mechanism, and the rotation of the gear 22 is decelerated and is transmitted to the throttle gear 21.

A conductor 19 is fixed to an upper portion of the throttle gear 21 fixed to the throttle shaft 5. When the motor 11 is rotated and the throttle shaft 5 is rotated, the conductor 19 is also rotated integrally with the throttle shaft 5.

Although not illustrated, the throttle gear 21 receives a rotational force in opposite directions to each other by a default spring and a return spring, and in a state in which the energization of the motor 11 is turned off, the throttle valve 6 has a predetermined opening degree (default opening degree). When the throttle valve 6 is opened from the default opening degree, a load on a default opening degree side, that is, in a closing direction acts by the return spring. When the throttle valve 6 is closed from the default opening degree, a load on the default opening degree side, that is, in an opening direction acts by the default spring.

As illustrated by a dotted line in FIG. 9, the TPS board 28 is attached to the internal space of the gear cover 2. The other end 113 of the conductor 110 is connected to the TPS board 28. The TPS board is disposed at a position facing the conductor 19. Electronic components such as ASIC are mounted on the TPS board 28.

The TPS board 28 detects an angle of the conductor 19, and outputs, as a sensor output, the detected angle from the conductor 110 to an external ECU via the connector 151. An appropriate opening degree of the throttle valve 6 is calculated by the ECU, and a rotation angle of the motor 11 is controlled.

As illustrated in FIG. 11, in a state in which the conductor 110 integrally molded with the gear cover 2 is fixed to the fixing member 120, one end 112 thereof is exposed to the space C inside the connector portion 131. The connector portion 131 is disposed outside the seal member 31 that forms a sealing forming space portion of the electric throttle device 1. Only the receiving portion 128 of the fixing member 120 is exposed to the space C inside the connector portion 131, and the remaining portion is covered with the molded body 130. Thus, an entrance of the infiltration path of the moisture and humidity intrusion into the seal member 31 of the electric throttle device 1 is only the receiving portion 128 of the fixing member 120. Moreover, the receiving portion 128 of the fixing member 120 is closed by the connector 151 inserted into the connector portion 131 of the gear cover 2 when the electric throttle device 1 is driven. Thus, it is possible to improve the airtightness of the electric throttle device 1.

According to the first embodiment, the following effects are obtained.

(1) The connector molding 100 is the connector molding 100 in which the conductor 110 and the fixing member 120 are integrally molded with the molded body 130 including the connector portion 131. The conductor 110 is fixed to the fixing member 120, and is integrally molded with the molded body 130 in which the external connection end portion protrudes into the space C in the connector portion 131. (i) A partial of the fixing member 120 is exposed to the space C of the connector portion 131 and the remaining portion is covered by the molded body 130, or (ii) the whole fixing member is covered by the molded body 130. Thus, it is possible to improve the airtightness of the connector molding 100.

(2) The fixing member 120 includes the fixing portions such as the fixing through hole 121 and the snap-fit structure 124 for fixing the conductor 110. Thus, it is not necessary to primarily mold the conductor 110 and the fixing member 120, and it is possible to improve productivity.

(3) The fixing member 120 is exposed to the space C in the connector portion 131 at a plurality of locations. Thus, the rotation of the fixing member 120 around the mold 230 is restricted, and thus, it is possible to accurately and easily position the conductor 110.

(4) The conductor 110 includes the leading portion 111, and the leading portion 111 includes the folded portion 115. The fixing member 120 includes the first fixing portion (fixing through hole 121) that fixes one side portion (end portion) of the folded portion 115 of the conductor 110, and the second fixing portion (snap-fit structure 124) that fixes the other side portion (end portion) of the folded portion 115 of the conductor 110. Therefore, it is possible to reliably fix the conductor 110 to the fixing member 120 without forming the pin holes 116 into the conductor 110 which the support pins 212*a* are inserted at the folded portion 115. Accordingly, it is possible to eliminate the exposure of a peripheral portion of the pin hole 116 of the conductor 110. That is, when the support pins 212*a* are fixed by being inserted into the pin holes 116, the portions of the conductor 110 at which the support pins 212*a* are inserted are exposed to the outside after the molding. In the present embodiment, it is possible to eliminate such external exposure of the conductor 110.

Second Embodiment

It has been described in the first embodiment that the receiving portion 128 of the fixing member 120 is exposed to the space C inside the connector portion 131 of the molded body 130. In a second embodiment, the entire fixing member 120 is buried in the molded body 130, that is, the entire fixing molded body is covered with the molded body 130.

Figure 14A:
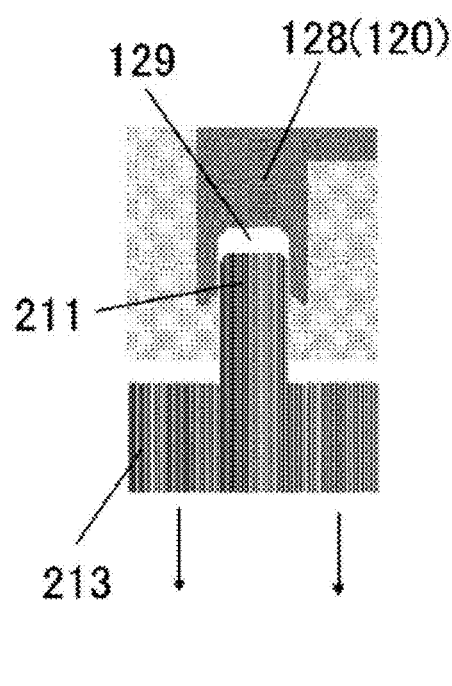
Figure 14B:
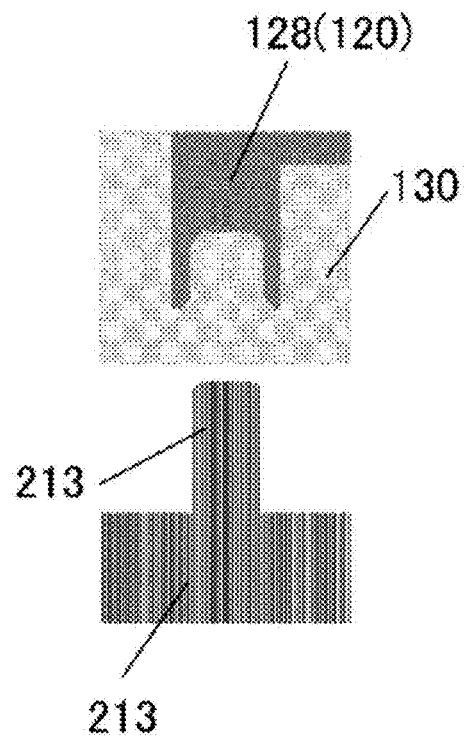

FIG. 14 illustrates the second embodiment of the connector molding of the present invention, and FIGS. 14(*a*) and 14(*b*) are cross-sectional views for describing a method for manufacturing the connector molding.

Hereinafter, a method for manufacturing the connector molding 100 of the second embodiment will be described with reference to FIGS. 14(*a*) and 14(*b*).

The connector molding 100 of the second embodiment is the same as that of the first embodiment except that the molded body 130 is filled with a mold resin for forming the molded body 130 in the recess portions 129 of the receiving portions 128 of the fixing member 120.

That is, as illustrated in FIG. 6, the conductor 110 is fixed to the fixing member 120, the holding pins 211 of the lower mold 210 pass through the recess portions 129 of the receiving portions 128 of the fixing member 120, and the support pins 212*a* of the lower mold 210 pass through the pin holes 116 of the conductors 110. The upper mold 220 is closed, and the mold resin is injected into the cavity 231.

After the mold resin is injected into the cavity 231, the pin support member 212 passing through the guide hole 213 of the lower mold 210 is slid outward while the mold resin has fluidity. Accordingly, a gap is formed between the holding pin 211 and the recess portion 129 of the receiving portion 128 of the fixing member 120, as illustrated in FIG. 14(*a*). This gap is filled with the mold resin having fluidity and is cooled, and thus, the recess portion 129 of the receiving portion 128 of the fixing member 120 is covered with the molded body 130, as illustrated in FIG. 14(*b*). That is, the entire fixing member 120 is covered with the molded body 130.

Other configurations and manufacturing methods in the second embodiment are the same as those in the first embodiment. Accordingly, the second embodiment also has the same effects as those in the first embodiment.

In the second embodiment, since the entire fixing member 120 is covered with the molded body 130 and does not have the portion exposed to the outside, it is possible to further improve the airtightness.

In the second embodiment, the fixing member 120 may be exposed to the internal space of the housing portion 132 of the molded body 130. That is, the fixing member 120 may not be exposed from an outer surface of the molded body 130. Here, the outer surface of the molded body 130 is a surface on the outside of the groove 134 serving as the sealing forming structure portion, and does not include the inside of the groove 134 including the internal space of the housing portion 132.

—Modification 1—

It has been described in the first embodiment that the fixing member 120 is fixed to the mold 230 by inserting the recess portions 129 formed in the fixing member 120 into the holding pins 211 formed at the mold 230.

Figure 15:
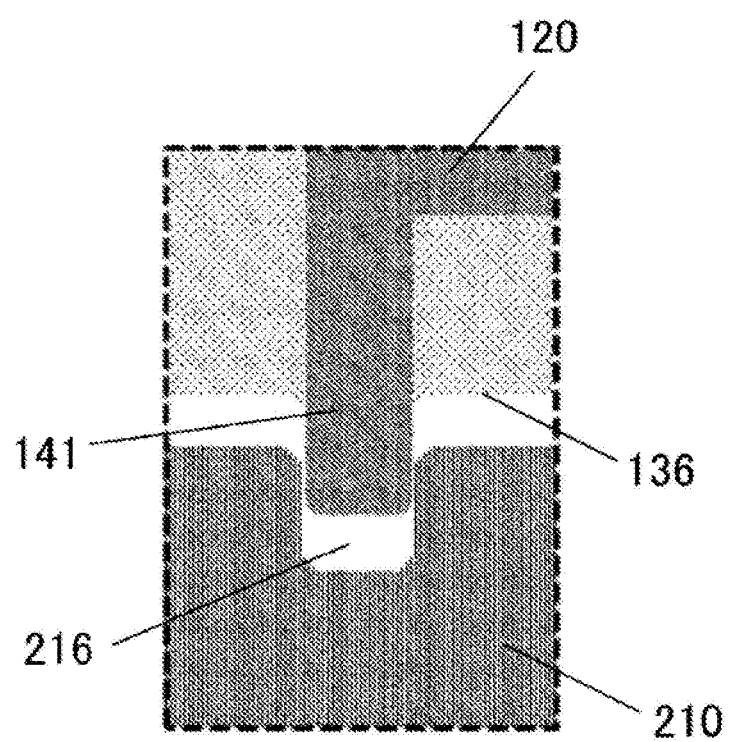
FIG. 15 is an enlarged cross-sectional view illustrating a structure for fixing a fixing member to a lower mold, which is Modification 1 of the connector molding of the present invention.

FIG. 15 is Modification 1 of the fixing structure between the fixing member 120 and the lower mold 210 of the first embodiment. In Modification 1, the fixing member 120 includes a protrusion portion 141 that protrudes from a front surface 136 of the molded body 130 to the outside. Meanwhile, the lower mold 210 includes a recess portion 216 into which the protrusion portion 141 of the fixing member 120 is inserted. In a state in which the insert-molding is completed, a portion of the fixing member 120 that protrudes from the front surface 136 of the molded body 130 is exposed to the space C (see FIG. 1) inside the connector portion 131.

—Modification 2—

Figure 16:
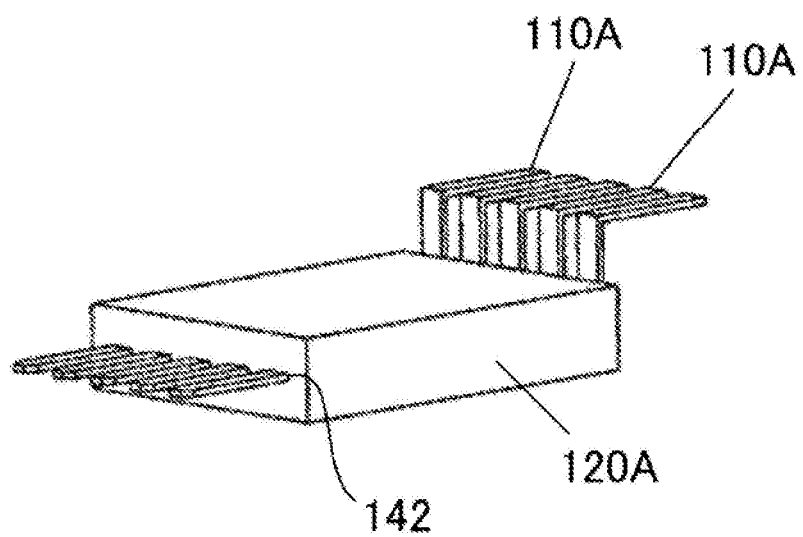
FIG. 16 is a perspective view illustrating a structure for fixing a conductor to a fixing member, which is Modification 2 of the connector molding of the present invention.

FIG. 16 is a perspective view illustrating a structure for fixing the conductor to the fixing member, which is Modification 2 of the connector molding of the present invention.

It has been described in the first embodiment that the conductor 110 is fixed to the fixing member 120 by the first fixing portion as the fixing through hole 121 and the second fixing portion as the snap-fit structure 124. However, the structure for fixing the conductor 110 to the fixing member 120 is not limited to this structure.

In Modification 2 illustrated in FIG. 16, a fixing member 120A includes only a plurality of through holes 142 as the fixing portions. Meanwhile, a conductor 110A has linear portions bent so as to be substantially perpendicular to a rising portion at both ends of the rising portion. A length of one linear portion is greater than a length of the through hole 142 formed in the fixing member 120A, and a length of the other linear portion is less than the length of the through hole. The long linear portion of each conductor 110A passes through the through hole 142 of the fixing member 120A, and a tip portion thereof protrudes outward from a side surface opposite to an insertion side. As stated above, only the through holes 142 can be used as the fixing portions of the fixing member 120A that fixes the conductor 110A.

—Modification 3—

Figure 17:
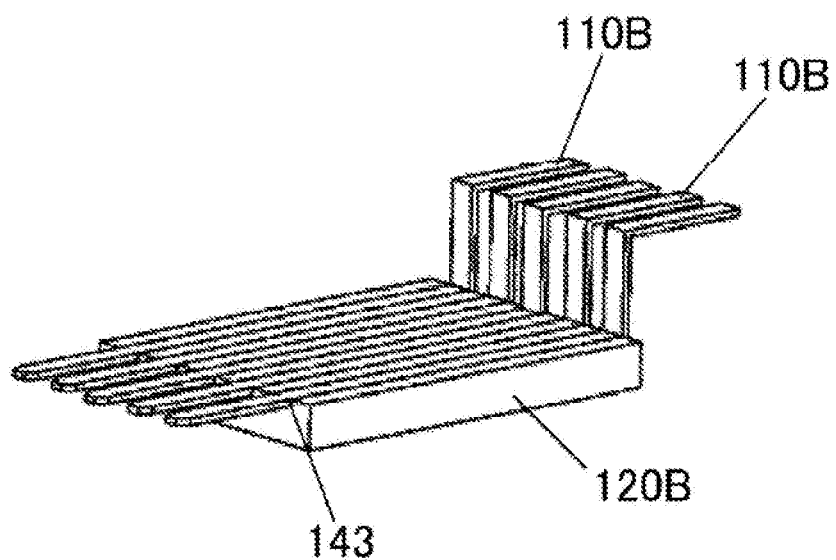
FIG. 17 is a perspective view illustrating a structure for fixing a conductor to a fixing member, which is Modification 3 of the connector molding of the present invention.

FIG. 17 is a perspective view illustrating a structure for fixing the conductor to the fixing member, which is Modification 3 of the connector molding of the present invention.

In Modification 3 illustrated in FIG. 17, a fixing member 120B includes only a plurality of grooves 143 as the fixing portions. Meanwhile, a conductor 110B has linear portions bent so as to be substantially perpendicular to a rising portion at both ends of the rising portion. A length of one linear portion is greater than a length of the groove 143 formed in the fixing member 120B, and a length of the other linear portion is less than the length of the groove. The long linear portion of each conductor 110B is inserted into the groove 143 of the fixing member 120B, and a tip portion thereof protrudes outward from a side surface opposite to a rising portion side. As stated above, only the grooves 143 can be used as the fixing portions of the fixing member 120B that fixes the conductor 110B. As illustrated in FIG. 8, the snap-fit structure 124 that includes the side portion 124*a* having flexibility and the engagement piece 124*b* may be formed at the side surface of the groove 143.

It has been described that the conductor 110 illustrated in FIG. 3 has the shape in which the folded portion 115 is drawn in the U shape. However, the folded portion 115 may have an arc shape or a V shape. Even when such a shape is adopted, it is preferable that the side portions (end portions) on both sides of the folded portion 115 are fixed without forming the pin holes 116 supported by the holding pins 211 in the folded portion 115 of the conductor 110. By doing this, it is possible to avoid the exposure of the portions of the conductor 110 corresponding to the holding pins 211 to the outside after the insert-molding, and it is possible to perform the insert-molding in a state in which the conductor 110 is reliably fixed to the fixing member 120. The structure of the fixing portion of the conductor 110 using the fixing member 120 may be obtained by appropriately combining the structure of the fixing portion described in the first embodiment with Modifications 2 and 3.

It has been described in the first embodiment that the two receiving portions 128 formed at the fixing member 120 are held by the two holding pins 211 formed at the mold 230 in order to fix the fixing member 120 to the mold 230. However, the number of receiving portions 128 and the number of corresponding holding pins 211 may be three or more. When the receiving portion 128 has an elongated shape in which a plurality of protrusion portions or recess portions that receive a plurality of support portions formed at the mold 230 are integrated, the receiving portion 128 can be a single member.

Although it has been in the first embodiment that the groove 134 into which the seal member 31 is fitted is formed in the molded body 130, the groove into which the seal member 31 is fitted may be formed in the throttle body 3.

Although it has been described in the aforementioned embodiments that the electric throttle device is used as the example of the electronic control device, the present invention can be applied to other electronic control devices such as battery modules.

Although various embodiments and modifications have been described above, the present invention is not limited to these contents. Other aspects considered within the scope of the technical idea of the present invention are also included within the scope of the present invention.

REFERENCE SIGNS LIST 1 electric throttle device (electronic control device)
3 throttle body (housing)
100 connector molding
110, 110A, 110B conductor
111 leading portion
112 one end (external connection terminal)
113, 113a the other end (internal connection terminal)
115 folded portion
120, 120A, 120B fixing member
121 fixing through hole (opening, first fixing portion)
124 snap-fit structure (second fixed portion)
124a side portion
124b engagement piece (locking portion)
128 receiving portion
129 recess portion (a part)
130 molded body
131 connector portion
132 housing portion
141 protrusion portion
142 through hole (a part)
210 lower mold (mold)
211 holding pin (support portion)
212 pin support member
216 recess portion (support portion)
220 upper mold
C space

The invention claimed is:

1. A connector molding comprising:
a conductor that includes an external connection end portion;
a fixing member that fixes the conductor; and
a molded body that includes a connector portion having an internal space through which the external connection end portion is exposed, the conductor and the fixing member being integrally molded with the molded body, wherein
the conductor is fixed to the fixing member, and is integrally molded with the molded body in a state in which the external connection end portion protrudes into the space within the connector portion,
(i) a part of the fixing member is exposed to the space within the connector portion, and a remaining portion is covered by the molded body, or
(ii) the entire fixing member is not exposed from an outer surface of the molded body, and the molded body has a holding groove into which a conductor is fitted, a locking part which is provided along the holding groove and fixes the conductor fitted into the holding groove, and an opening which is formed astride a plurality of holding grooves adjacent to each other, the opening being filled with a mold resin in the molded body.

2. The connector molding according to claim 1,
wherein the fixing member includes a fixing portion that fixes the conductor, and the fixing portion includes an opening or an engagement portion.

3. The connector molding according to claim 1,
wherein the fixing member is exposed to the space within the connector portion at a plurality of locations.

4. The connector molding according to claim 1,
wherein the conductor includes a leading portion connected to the external connection end portion, and the leading portion includes a folded portion, and
the fixing member includes a first fixing portion that fixes one end portion side of the folded portion and a second fixing portion that fixes the other end portion side of the folded portion.

5. An electronic control device comprising:
the connector molding according to claim 1; and
a housing that houses an electronic component,
wherein the connector molding includes a housing portion that houses an electronic component, an internal connection end portion of the conductor is connected to the electronic component within the housing portion, and the housing portion and the housing are assembled while being sealed externally.

6. The connector molding according to claim 1,
wherein the molded body includes a housing portion that houses an electronic component, and
the conductor includes an internal connection end portion exposed within the housing portion at the other end of the external connection end portion.

7. The connector molding according to claim 6,
wherein the connector molding is a cover attached to a housing of an electronic control device so as to be sealed from the outside.

8. A method for manufacturing a connector molding, comprising:
fixing a conductor including an external connection end portion by a fixing member; and
supporting a part of the fixing member by a support portion of a mold, and forming a molded body including a connector portion having an internal space through which the external connection end portion is exposed through insert-molding using the conductor and the fixing member as insert members, wherein
the molding is performed such that the part of the fixing member supported by the mold is positioned at an interface with the space of the connector portion, and the bolded body has a holding groove into which a conductor is filled, a locking part which is provided along the holding groove and fixes the conductor fitted into the holding groove, and an opening which is formed astride a plurality of holding grooves adjacent to each other, the opening being filled with a mold resin in the molded body.

9. The method for manufacturing a connector molding according to claim 8,
wherein the insert-molding is performed in a state in which the conductor is fixed by an opening or an engagement portion formed at the fixing member.

* * * * *